US009098634B2

(12) United States Patent
Busi et al.

(10) Patent No.: US 9,098,634 B2
(45) Date of Patent: Aug. 4, 2015

(54) CREATING TEST TEMPLATES BASED ON STEPS IN EXISTING TESTS

(71) Applicant: Hewlett-Packard Development, L.P., Houston, TX (US)

(72) Inventors: Eliraz Busi, Yehud (IL); Oren Gurfinkel, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 200 days.

(21) Appl. No.: 13/892,819

(22) Filed: May 13, 2013

(65) Prior Publication Data

US 2014/0337673 A1 Nov. 13, 2014

(51) Int. Cl.
G06F 11/00 (2006.01)
G06F 11/36 (2006.01)
G06F 11/263 (2006.01)

(52) U.S. Cl.
CPC .......... *G06F 11/3684* (2013.01); *G06F 11/263* (2013.01); *G06F 11/3672* (2013.01)

(58) Field of Classification Search
None
See application file for complete search history.

(56) References Cited

U.S. PATENT DOCUMENTS

| | | | |
|---|---|---|---|
| 5,754,760 A * | 5/1998 | Warfield | 714/38.1 |
| 6,282,527 B1 * | 8/2001 | Gounares et al. | 706/13 |
| 6,353,904 B1 * | 3/2002 | Le | 714/726 |
| 6,697,961 B1 * | 2/2004 | Petrenko et al. | 714/26 |
| 6,715,108 B1 * | 3/2004 | Badger et al. | 714/38.1 |
| 6,898,784 B1 * | 5/2005 | Kossatchev et al. | 717/126 |
| 7,490,319 B2 | 2/2009 | Blackwell et al. | |
| 7,743,090 B1 * | 6/2010 | Gibson et al. | 709/202 |
| 7,823,128 B2 | 10/2010 | Bundy et al. | |
| 2009/0217302 A1 * | 8/2009 | Grechanik et al. | 719/320 |
| 2010/0023294 A1 | 1/2010 | Fan et al. | |
| 2012/0144373 A1 * | 6/2012 | Cook | 717/125 |
| 2012/0296687 A1 | 11/2012 | Satyanarayana et al. | |
| 2012/0317547 A1 * | 12/2012 | Lau et al. | 717/124 |
| 2014/0325483 A1 * | 10/2014 | Pilot et al. | 717/124 |

OTHER PUBLICATIONS

JUnit a Cook's Tour, <http://junit.sourceforge.net/doc/cookstour/cookstour.htm>.

* cited by examiner

*Primary Examiner* — Gabriel Chu
(74) *Attorney, Agent, or Firm* — Hewlett-Packard Patent Department

(57) ABSTRACT

Example embodiments relate to creating test templates based on steps in existing tests. In example embodiments, a testing computing device may select an existing test from multiple existing tests. Each existing test of the multiple existing tests may include a set of distinct steps. The testing computing device may determine a sub-sequence related to the selected existing test. The sub-sequence may be based on a subset of the distinct steps included in the selected existing test. The testing computing device may determine that the distinct steps in the subset occur in a number of existing tests from the multiple existing tests, and may generate a test template using the sub-sequence. The test template may include the distinct steps in the subset.

13 Claims, 6 Drawing Sheets

CREATING TEST TEMPLATES BASED ON STEPS IN EXISTING TESTS

BACKGROUND

Software testers may use testing tools to validate and verify that a computer software program functions as expected (e.g., meets certain requirements, is free of bugs, etc.). Testing tools may analyze source code of a software program (or a compiled version of the software program) and may execute the software program or simulate execution of the software program with various inputs (i.e., test data). Software testers may strategically create test data to test various features of the software program, and the software testers may know how the software program should respond to certain test data. These expectations of how the software program should respond may be input into the testing tool. After the testing tool executes the software program with the test data, the testing tool or the software tester may compare the actual response (e.g., the software program's output or behavior) with the expected response.

BRIEF DESCRIPTION OF THE DRAWINGS

The following detailed description references the drawings, wherein.

DETAILED DESCRIPTION

Figure 1:
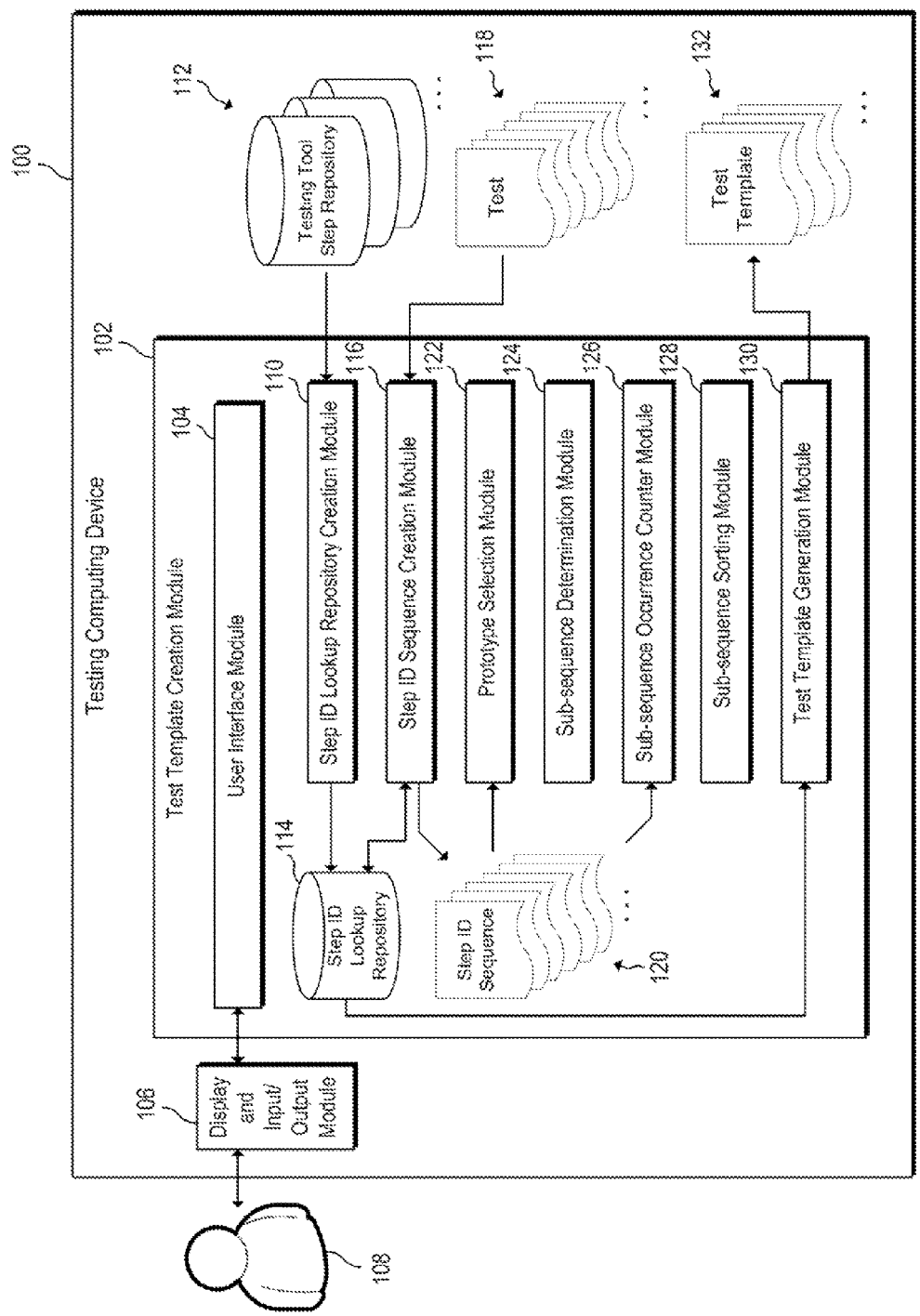
FIG. 1 is a block diagram of an example testing computing device for creating test templates based on steps in existing tests.

As explained above, testing tools may execute a software program or simulate execution of the software program with various inputs (i.e., test data). Some software testing tools may include a repository or library of testing steps that may be used as test data to test a software program. For example, a software tester may use such a testing tool to load the source code (or a compiled version) of the software program. Then, the software tester may use the testing tool to select at least one testing step, typically multiple testing steps. Multiple testing steps may be organized and saved as a test file (or just "test" for short). Multiple test files may be created, each one including various combinations of testing steps. The software tester may then use the testing tool to execute the software program with any number of testing steps and/or test files. Then, the testing tool or the software tester may compare the actual response of the software program (e.g., the software program's output or behavior) with the expected response given the particular testing steps and/or test files used.

Software testers may invest significant effort and money to design tests that are efficient and effective. Software testers and/or testing teams may create a multitude of tests to test various segments and features of the software program. In some situations, several of the tests may have testing steps in common, sometimes many common testing steps. Additionally, when a new test is created, the new test may include many testing steps that were used (sometimes frequently) in previously created tests. As one specific example, the software program may be a web application for searching for and booking airline flights. For such an application, example testing steps may be, without limitation, establishing a network connection with the application, logging into the application, searching for flights, performing various database queries, checking a customer's billing information, and sending a confirmation email. It may be the case that several tests that are used to verify the functionality of such an application may include at least one, if not several, of these common testing steps.

Typically, when a software tester creates a new test, the software tester starts from scratch and then adds testing steps one by one to the test file, along with any other logic required to make the test run correctly. This process may result in redundant work, as many of the testing steps may be similar to testing steps used in existing tests, as described above. In some situations, a software tester may access one or more existing tests to copy over one or more testing steps (and perhaps related logic) as a starting point for creating the new test. However, this is a manual process (e.g., copying and pasting manually selected steps and/or logic), and it may be challenging to accurately reproduce the steps and/or logic correctly. Significant time and money may be spent reviewing to ensure that no errors were introduced during such copying. Additionally, it may be difficult to locate and identify existing test files with testing steps that are particularly relevant to the new test (e.g., especially if the set of test files is large).

Various testing tools may automatically generate tests; however, these testing tools do not reference existing tests and instead use hard-coded, pre-defined information. Various other testing tools may combine multiple existing tests into a single test; however, for these testing tools, the existing source tests must be specified, and then the resulting target test is essentially a test that includes all the testing steps from the source tests. These testing tools do not determine commonly-used testing steps (nor the most valuable testing steps) from a set of tests to then use these steps to create the new test.

The present disclosure describes creating test templates based on steps in existing tests, where the steps to be used from existing tests are automatically selected, for example, based on the value of the steps (e.g., the value of the steps for creating a test template). The present disclosure describes analyzing existing tests, identifying sequences of existing testing steps, and determining the frequency of particular sequences of testing steps within a set of test files to determine the value of particular testing steps. Existing testing steps with a higher value may then be used to create at least one new test template. Once a test template has been created, a software tester can use the test template to create at least one new test by configuring the steps from the template and potentially adding more steps as needed. The present disclosure may be used to increase the accuracy of new tests, for example, because new tests are created based on successful and proven testing steps and perhaps logic from existing tests. The present disclosure may be used to reduce or eliminate redundant work by software testers, for example, by allowing software testers to avoid writing or manually copying the same testing steps and logic many times. Thus, the present disclosure may allow software testers to quickly and accurately create new tests, which may save time and money.

It should be understood that the present disclosure is not limited to test files and testing steps provided by and/or used by testing tools. The present disclosure may be useful for any test files that include a number of testing steps to be provided as input to test a software program. Therefore, although the descriptions herein may refer to a testing tool, this is just one example of how test files and testing steps may be provided and/or used, and various other embodiments of the present disclosure may be apply to testing steps and test files that are not provided by a particular testing tool.

FIG. 1 is a block diagram of an example testing computing device 100 for creating test templates based on steps in existing tests. Testing computing device 100 may be any computing device capable of accessing existing testing steps and/or test files and creating at least one test template. In some embodiments, testing computing device 100 may actually be more than one computing device. In other words, the components shown in computing device 100 (e.g., modules, repositories, inputs, outputs, etc.) may be, but need not be, distributed across multiple computing devices, for example, computing devices that are in communication with each other (e.g., via a network). In these embodiments, the multiple computing devices may be separate from each other, perhaps geographically separate. The term "system" may be used to refer to one computing device or multiple computing devices in communicate with each other. As illustrated in FIG. 1, testing computing device 100 may receive input from and provide output to at least one user 108 (e.g., a software tester). User 108 may communicate with at least one module of the testing computing device 100 via a display and input/output module 106 included in the testing computing device 100.

Testing computing device 100 may include a test template creation module 102, which may be used to creating test templates based on steps in existing tests, as described further herein. Test template creation module 102 may accept as input a number of testing steps (e.g., from at least one testing tool step repository 112). For example, a testing tool may maintain a list of testing steps that may be used to test various software programs. Test template creation module 102 may accept as input a number of existing tests 118 (also referred to as test files). Each test file may include a number of testing steps and perhaps related logic. In one particular scenario, a test file (e.g., from 118) may include a number of testing steps that are provided by a testing tool step repository (e.g., from 112). Test template creation module 102 may create or generate as output at least one test template 132 (also referred to as test template files). More details regarding the contents of test templates may be provided below.

Test template creation module 102 may include a number of modules 104, 110, 116, 122, 124, 126, 128, 130. Each of these modules may include a series of instructions encoded on a machine-readable storage medium and executable by a processor of the testing computing device 100. In addition or as an alternative, each of these modules may include one or more hardware devices including electronic circuitry for implementing the functionality described below. With respect to the modules described and shown herein, it should be understood that part or all of the executable instructions and/or electronic circuitry included within one module may, in alternate embodiments, be included in a different module shown in the figures or in a different module not shown. Testing computing device 100 may include or have access to a number of repositories 112, 114 and a number of files (e.g., digital files) 118, 120, 132. The term repository may generally refer to a data store that may store digital information. Each of these repositories and files may be stored (e.g., in a volatile or non-volatile manner) in at least one physical storage mechanism (e.g., RAM, ROM, hard drive, solid state drive, tap drive or the like) capable of storing digital information including, for example, a digital database, a file capable of storing text, settings or the like, or other type of data store. Each of the at least one physical storage mechanism may be located inside testing computing device 100 or may be located external to testing computing device 100 and accessible by testing computing device 100.

User interface module 104 may allow a user 108 (e.g., a software tester) to interact (e.g., via a display and input/output module 106) with the test template creation module 102. User interface module 104 may allow a user 108 to cause at least one of the other modules 110, 116, 122, 124, 126, 128, 130 of test template creation module 102 to run or execute. User interface module 104 may allow a user 108 to perform various selections, for example, user 108 may select a testing tool step repository 112 to provide a set of testing steps as input to the test template creation module 102. As another example, user interface module 104 may allow a user 108 to select a set of existing tests 118, and perhaps at least one individual test (e.g., to be a prototype test) from the set. As another example, user interface module 104 may allow a user 108 to select at least one sub-sequence (e.g., from a sorted list as explained in more detail below) to be used to create at least one test template 132.

Step ID (identifier) lookup repository creation module 110 may create a step ID (identifier) lookup repository 114, and/or may add information to such a repository. Step ID lookup repository creation module 110 may accept as input a number of testing steps (e.g., from at least one testing tool step repository 112). Each testing step repository 112 may be associated with a testing tool where the testing tool provides the testing steps from the testing tool step repository to a user to create tests.

Figure 2:
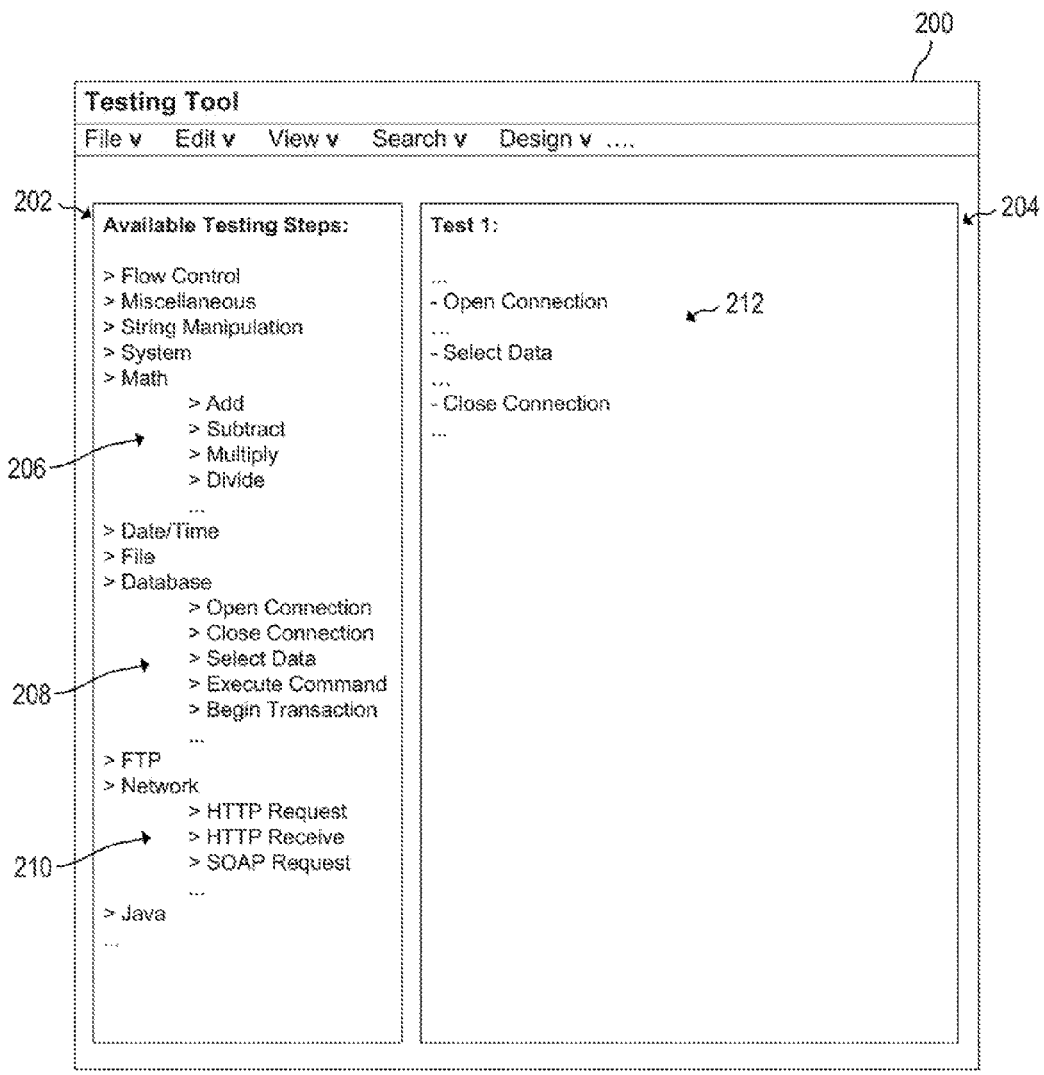
FIG. 2 depicts an example screen shot from an example testing tool, where such a testing tool may provide at least one existing test that may be used to create test templates based on steps in existing tests.

It may be useful to describe one particular example of testing steps, for example, in relation to a testing tool. FIG. 2 depicts one example screen shot 200 from an example testing tool. As can be seen in FIG. 2, the testing tool provides (e.g., via section 202) various testing steps, for example, organized by categories. In the example of FIG. 2, categories of testing steps include, without limitation math-related steps, database-related steps, and network related steps. Many other categories of steps may be seen in FIG. 2 and many other categories may be contemplated. Each category of steps may be expanded to reveal a number of testing steps related to the category. As can be seen in FIG. 2, the testing tool (e.g., via section 202) provides various testing steps, for example, testing steps 206 (e.g., categorized as math-related), testing steps 208 (e.g., categorized as database-related) and testing steps 210 (e.g., categorized as network-related). Such a testing tool may allow a user to select various steps from the available testing steps to design a test (e.g., Test 1 shown in section 204). For example, a user may click and/or drag various steps from section 202 to cause the steps (e.g., 212) to appear in section 204. The user may then use the created test (e.g., Test 1) to test a software program, or may save the test to a test file for later use.

Step ID lookup repository creation module 110 may analyze the testing steps that are received (e.g., from at least one testing tool step repository 112), and may generate a unique identifier (ID) for each unique testing step. Such a unique ID may be referred to as a step ID. A step ID may be, for example, a string of characters (e.g., letters, numbers and/or other characters). It should be understood that unique IDs/step IDs may not be used in some embodiments or situations. In such embodiments or situations, test template creation module 102 may handle (e.g., identify, collect, search for, etc.) the testing steps directly. For example, each testing step may include a text string that indicates the purpose of the testing step (e.g., "open connection"). Handling unique IDs/step IDs instead of testing step strings may be easier for the test template creation module 102. For example, representing testing steps with step IDs may allow for easy searching and sorting. However, the present disclosure contemplates either using unique IDs/step IDs or not using them. For ease of explanation, the following descriptions may refer to embodiments and/or scenarios where unique IDs/step IDs are used. For example existing tests (e.g., 118) may be converted into step ID sequences (e.g., 120), which may be used by various modules of the test template creation module 102. However, if unique IDs/step IDs are not used, the existing tests 118 may be used directly by the various modules. Therefore, for the following descriptions, when references are made to unique IDs, step IDs, step ID sequences and the like, it should be understood that in alternate embodiments, such items may not be used and the tests, testing steps, and the like may be used directly. For example, instead of step ID sequences, testing step sequences may be used.

The testing steps that are received by module 110 (e.g., from at least one testing tool step repository 112) may include all the unique testing steps that may potentially be used to create a test. Each unique potential testing step may be associated with (i.e., mapped to) a unique ID (referred to as a step ID). For example, referring to FIG. 2, the testing step of "open connection" may be associated with a particular step ID, and likewise, the testing step of "select data" may be associated with a different particular step ID. Thus, it can be seen that if a particular testing step is used for multiple tests, the testing step would be associated with the same step ID regardless of which of the multiple tests the step appears in.

Step ID lookup repository creation module 110 may at some point initially create step ID lookup repository 114. After creation, Step ID lookup repository creation module 110 may add information to repository 114. Once module 110 has analyzed all of the received potential testing steps, repository 114 may include entries or pairs of information for each unique potential testing step. A first item in a pair may be a particular testing step, for example, the text string of the testing step (e.g., Add( )). The testing steps may be saved in repository 114 without any arguments (e.g., the specific numbers to be added for an Add step). The second item in a pair may be a step ID uniquely associated with the particular testing step (e.g., step ID "TS00276" for testing step Add( )). A single entry or pair of information may exist in repository 114 for each unique potential step. To populate repository 114, module 110 may look at each received testing step, e.g., one at a time. For each testing step, if the testing step has not been seen before (e.g., a related entry/pair does not already exist in repository 114), module 110 may generate a unique step ID for it. Then, module 110 may store the testing step and the step ID together as a pair as a new entry in repository 14. Such a routine may repeat until no more received testing steps exist.

Step ID sequence creation module 116 may scan a number of existing tests 118 (e.g., test files) and may generate a number (e.g., one for each test) of step ID sequences 120. Step ID sequence creation module 116 may accept as input a set of existing tests 118. Each test may include a number of testing steps and perhaps related logic. Each testing step may have been provided by a testing tool and/or testing tool step repository (e.g., from 112). Step ID sequence creation module 116 may access step ID lookup repository 114 for example, to determine a step ID associated with a particular testing step from one or more of the tests 118. To generate a step ID sequence (e.g., in 120), module 116 may access or read each test (e.g., from 118), for example, one at a time. For each test, module 116 may identify e.g., one at a time) the testing steps in the test. For each testing step, module 116 may access step ID lookup repository 114 to provide the testing step and to receive from the step ID lookup repository 114 the step ID associated with the testing step. Module 116 may add the step ID to the current step ID sequence. Such a routine may be performed for each test in set 118 to create a number of step ID sequence files 120. At the end of such routines, each step ID sequence (e.g., in 120) may include a sequence of step IDs (i.e., step ID sequence) that represents the associated test used to create the step ID sequence.

Prototype selection module 122 may select at least one of the step ID sequences 120 to be at least one prototype. Because each step ID sequence 120 may be associated with a test 118, it may also be said that prototype selection module 122 selects at least one test 118 to be a prototype. However, if unique IDs are used to represent testing steps, a prototype may eventually need to be in the form of a step ID sequence. If unique IDs are not used (as explained above), then prototype selection module 122 may select at least one test 118 to be at least one prototype. The prototype(s) may be selected automatically or with input from a user (e.g., user 108 via user interface module 104). For automatic selection, prototype selection module 122 may base its selection on a number of factors, heuristics or the like about the various tests 118 and/or step ID sequences 120. For example, tests with a larger number of testing steps may be more useful as prototypes. As another example, prototype selection module 122 may determine that various tests more completely test commonly used features associated with particular software programs. The prototype(s) may be used to generate a number of sub-sequences, as described in more detail below. In theory subsequences could be generated based on all the step ID sequences in set 120 (or all the tests in set 118); however, such a subsequence generation routine may be prohibitively expensive (e.g., in terms of performance). Thus, prototype selection module 122 may select a single test/step ID sequence (or a pool of tests/step ID sequences) to be at least one prototype, and then the prototype(s) may be used to generate sub-sequences.

Sub-sequence determination module 124 may analyze at least one prototype (e.g., selected by module 122) to identify a number of sub-sequences. The descriptions that follow may refer to a single prototype being analyzed, but it should be understood that multiple prototypes may be analyzed to identify sub-sequences. The number of the sub-sequences in a prototype (e.g., a prototype step ID sequence) may depend on the number of testing steps in the associated test. For example, if a test includes X (an integer) testing steps, then there may be up to $2^x$ sub-sequences if an exponential subsequence identification routine is used. Table 1 below shows (in row 1) a test with four testing steps (i.e., test length is 4). The steps of this particular test may be represented in table 1 as A, B, C, D. If step IDs are used to represent testing steps, each of A, B, C, D may be a unique step ID. In other embodiments, each of A, B, C, D may be the testing step itself (e.g., the text string of the testing step). If an exponential subsequence identification routine is used, then row 2 of table 1 shows all the possible testing steps associated with the test of row 1. There are $2^4$ that may be identified using such a routine.

TABLE 1

| 1 | Test = {A, B, C, D} |
|---|---|
| 2 | Sub-sequences: |
|   | { } |
|   | {A} |
|   | {B} |
|   | {C} |
|   | {D} |
|   | {A, B} |
|   | {A, C} |
|   | {A, D} |
|   | {B, C} |
|   | {B, D} |
|   | {C, D} |
|   | {A, B, C} |
|   | {A, B, D} |
|   | {B, C, D} |
|   | {A, C, D} |
|   | {A, B, C, D} |

In the example of table 1, it may be assumed that the order of the testing steps may be maintained for any template that is created based on such sub-sequences. Therefore, sub-sequence determination module 124 may not identify any different sub-sequences for out-of-order testing steps. For example, sub-sequence determination module 124 may not identify {B,A} as a different sub-sequence from {A,B} unless the testing step A actually occurs in the test after step B. In other embodiments, sub-sequence determination module 124 may consider reordered sub-sequences as different sub-sequences, in which case the number of sub-sequences associated with a particular prototype may grow significantly.

In the case of an exponential sub-sequence identification routine described above, each test or step ID sequence may contain many sub-sequences, and thus it may become clear why it may be prohibitively expensive (e.g., in terms of performance) to compute all the sub-sequences for all tests in a large test set. This may be an example reason why a few or just one test or step ID sequence may be selected to be a prototype.

Sub-sequence determination module 124 may utilize other types of sub-sequence identification routines (e.g., other than exponential), for example, a linear routine as shown below in table 2. Table 2 again shows (in row 1) a test with four testing steps. The steps of this particular test may be represented in table 2 as E, F, G, H. If a particular linear sub-sequence identification routine is used, then row 2 of table 2 shows an example of all the possible testing steps associated with the test of row 1. The number of sub-sequences (4) may be equal to the length of the test

TABLE 2

| 1 | Test = {E, F, G, H} |
|---|---|
| 2 | Sub-sequences: |
|   | {E} |
|   | {E, F} |
|   | {E, F, G} |
|   | {E, F, G, H} |

A linear sub-sequence identification routine may be less expensive (e.g., in terms of performance), which means that more tests or step ID sequences may be analyzed to generate sub-sequences, perhaps all the tests in set 118 or all the step ID sequences in set 120. However, the sub-sequences identified by such a routine may be less valuable and/or more limiting than sub-sequences that result from an exponential routine. For example, as can be seen in row 2 of table 2 above, every sub-sequence includes step E, even if step E is not a particularly valuable step. This may result in less useful templates generated later on.

Sub-sequence occurrence counter module 126 may receive as input the sub-sequences identified by sub-sequence determination module 124. Sub-sequence occurrence counter module 126 may then search through step ID sequences 120 to count the number of times each sub-sequence appears (i.e., the frequency) in the step ID sequences 120 (e.g., excluding any step ID sequences selected as prototypes). To count the number of times each sub-sequence appears, for a particular sub-sequence, module 126 may search through each of the step ID sequences (e.g., in 120) and determine whether the sub-sequence occurs in any of the step ID sequences. Each time module 126 detects that sub-sequence occurs in a step ID sequence, module 126 may add one to an occurrence count for the particular sub-sequence. Such a routine may repeat until no more sub-sequences exist. To determine whether a sub-sequence occurs in a particular step ID sequence, sub-sequence occurrence counter module 126 may only detect that each step (e.g., step ID) from the sub-sequence appears in the particular step ID sequence. In other words, the order of the steps/step IDs in the particular step ID sequence may not matter. In other embodiments or situations, sub-sequence occurrence counter module 126 may consider the order, however.

Sub-sequence occurrence counter module 126 may provide (e.g., indicate or pass) a number of the sub-sequences (e.g., those identified by sub-sequence determination module 124) to sub-sequence sorting module 128 along with an occurrence count for each sub-sequence. Sub-sequence occurrence counter module 126 may exclude (e.g., not provide) a number of the sub-sequences, for example, if the occurrence count for the particular sub-sequences is too low (e.g., below a defined threshold). More details regarding excluding sub-sequences and such an "occurrences threshold" may be described more below.

Sub-sequence sorting module 128 may sort, rank or otherwise group sub-sequences (e.g., provided by module 126) according to at least one factor or metric. For example, sub-sequence sorting module 128 may sort sub-sequences by the number of occurrences for each sub-sequence and/or by length (e.g., number of steps or step IDs) of each sub-sequence. The factors or metrics used to sort sub-sequences may be used to indicate the value (e.g., to a user/software tester) of the sub-sequences. For example, the number of occurrences (e.g., frequency) of a sub-sequence may indicate the steps/step IDs of the sub-sequence are commonly used in tests, and therefore, such steps may often be required. If required steps were automatically provided by a test template, users may save significant amounts of time. As another example, the length (e.g., number of steps/step IDs) of a sub-sequence may indicate that the sub-sequence provides more content and perhaps more fully exercises various features of a software program. If more steps are automatically provided by a template, assuming they are necessary steps, a user may need to waste less time entering or copying such steps.

Figure 3A:
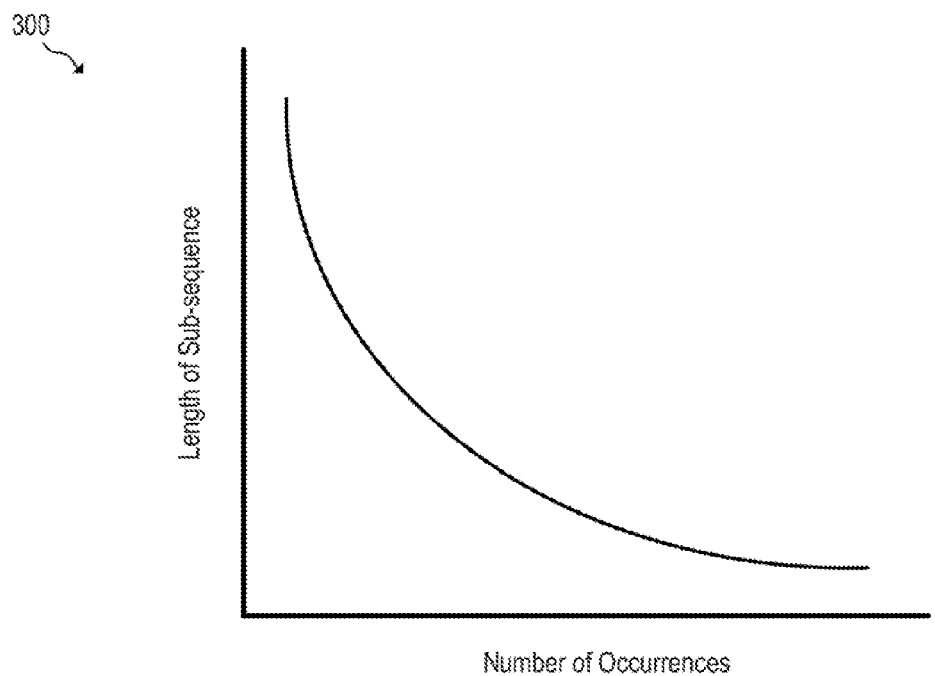
FIG. 3A depicts a graph that shows an example tradeoff between the number of occurrences of a sub-sequence and the length of the sub-sequence, where such a tradeoff may be considered for creating test templates based on steps in existing tests.

A tradeoff may exist between some of the factors or metrics used to sort sub-sequences, for example, between the number of occurrences for a sub-sequence and length of the sub-sequence. FIG. 3A depicts a graph 300 that shows an example tradeoff between number of occurrences and length. As can be seen in FIG. 3A, as the length of the sub-sequence increases, the number of occurrences for the sub-sequence may decrease. This inverse relationship may exist because long sub-sequences are less likely to occur in several tests because each test must include all the steps/step IDs of the long sub-sequence. As one specific example, if no sub-sequences were excluded (e.g., by module 126), the sub-sequence with the most occurrences may only include one or two steps. It may be seen that the value of such a short sub-sequence has minimal value to a user. On the other hand, a very long sub-sequence may not be particularly valuable to a user if the sub-sequence is not commonly used in existing tests.

Figure 3B:
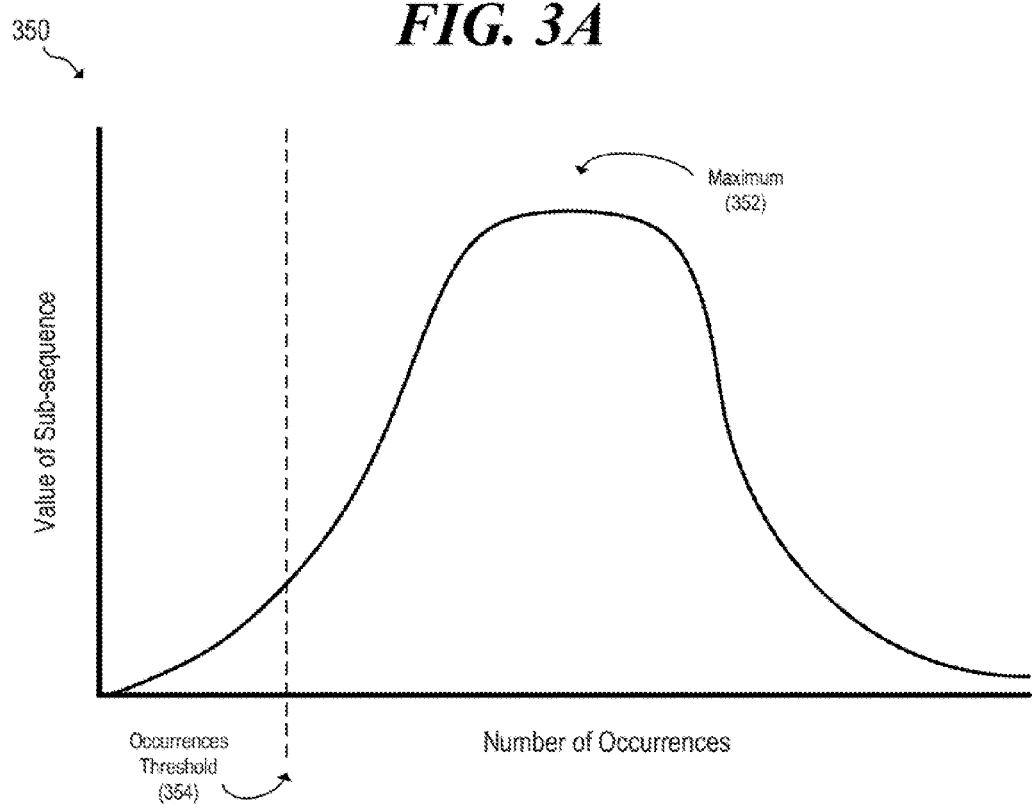
FIG. 3B depicts a graph that shows an example tradeoff between the number of occurrences of a sub-sequence and the value of the sub-sequence, where such a tradeoff may be considered for creating test templates based on steps in existing tests.

FIG. 3B depicts a graph 350 that shows another example tradeoff between number of occurrences and the value of the sub-sequence. As described above, and as can be seen in FIG. 3B, as the number of occurrences increases from zero, the value of the sub-sequence increases, for example, because increased occurrences may indicate that the steps/step IDs of the sub-sequence are commonly used in tests. As the number of occurrences increases even further, as described above, the length of the sub-sequences may decrease, perhaps to a very short length. Therefore, as the number of occurrences becomes too large, the value of the sub-sequences (e.g., very short sub-sequences) becomes small. Thus, a number of sub-sequences somewhere in the middle (e.g., near the middle of the occurrences axis, near maximum 352) may provide optimal value to a user.

To address at least one of the tradeoffs described above, an occurrences threshold may be defined. The occurrences threshold may be defined by a user (e.g., user 108) or it may be defined automatically by test template creation module 102. The occurrences threshold may indicate the minimum number of tests/step ID sequences that a sub-sequence must occur in if it is to be considered for a test template. The occurrences threshold may be a number that is between zero and the total number of existing tests/step ID sequences. For example, as alluded to above, sub-sequence occurrence counter module 126 may only provide sub-sequences (e.g., to module 128) that occur in at least the number of tests specified by occurrences threshold. An example occurrences threshold is shown in FIG. 3B. The occurrences threshold may ensure that the number of occurrences is at least larger than a certain amount. In some embodiments, an additional occurrences threshold may be used, for example, related to the right side of chart 350. Such an additional occurrences threshold may ensure that the number of occurrences does not become too large, thus causing the value of the sub-sequences to be minimal. The one or more occurrences thresholds may be configured or optimized to cause sub-sequence sorting module 128 to sort, rank or otherwise group sub-sequences in a manner that provides sub-sequences with maximum value to the user more prominently than lower-value sub-sequences.

Sub-sequence sorting module 128 may output at least one list (e.g., ordered list) or group of sub-sequences, where each sub-sequence may be selected to create a template. In some embodiments, sub-sequence sorting module 128 may select which sub-sequence(s) may be used to create at least one template. For example, sub-sequence sorting module 128 may include a module that uses the ordered list of sub-sequences to select the top (e.g., most valuable) sub-sequence (s). In some situations, such a module may access user settings that indicate a preference for certain factors in the sub-sequence selection, for example, a preference for longer sub-sequences or a preference for more common subsequences. In some situations, such a module may accept user input (e.g., form user 108) that indicates how the sub-sequences should be sorted (e.g., which sorting factors should be given more emphasis) and/or which sub-sequence(s) should be selected. In some embodiments, the selection of the sub-sequence(s) is performed in module 130.

Test template generation module 130 may create at least one test template (e.g., in 132) based on at least one sub-sequence. In some examples, test template generation module 130 may receive an ordered list or groups of sub-sequences provided by module 128, as described above. In such an example, test template generation module may select at least one sub-sequence to create at least one test template. Such selection may occur in a similar manner as described above (e.g., perhaps with user settings or user input) with regard to module 128. In other examples, test template generation module 130 may receive at least one selected sub-sequence for template creation, for example, if sub-sequence selection is performed in module 128.

Test template generation module 130 may create one template for each selected sub-sequence. Test template generation module 130 may, alternatively, create more than one template from a single sub-sequence or a single template from multiple sub-sequences. For explanation purposes, the following descriptions will describe creating one test template from one sub-sequence. To create a test template from a sub-sequence, test template generation module 130 may convert the step IDs of the sub-sequence back to testing steps (e.g., using step ID repository 114). Test template generation module 130 may start by identifying all the step IDs within the sub-sequence. Then, test template generation module 130 may access step ID lookup repository 114 to determine the testing step (e.g., the text string) associated with each step ID. For each step ID in the sub-sequence, test template generation module 130 may provide the step ID to repository 114, and may receive in response the associated testing step. Once all the testing steps are received for all the step IDs in the sub-sequence, test template generation module 130 may then write all the testing steps to a new file called a test template (or test template file). Such a test template (and perhaps other test templates created) may be represented by the set of test template files 132.

Each test template (e.g., in 132) created by module 130 may be a core set of testing steps that may then be used to create one or more new tests. A test template may include testing steps that are commonly used and/or testing steps that are required for certain purposes, as described above. In this respect, a user can create a new test by starting with a set of valuable or required steps, where these steps are included in a proper format and with any proper logic, etc. In some examples, testing steps in a test template may be provided in the same order as the testing steps or step IDs appeared in the related sub-sequence. In other examples, the order of the testing steps may be changed. Testing steps in a template may be bare testing steps, for example, without arguments provided (e.g., Add( ) without the numbers to add provided). Thus, to create a new test from a testing template, a user may configure the provided testing, steps (e.g., by adding argument, etc.). Additionally, the user may remove some testing steps and/or add more steps to the steps provided by the testing template. A user may create multiple new tests from a single test template, for example, by configuring the test template steps differently and/or by adding different additional steps.

Figure 4A:
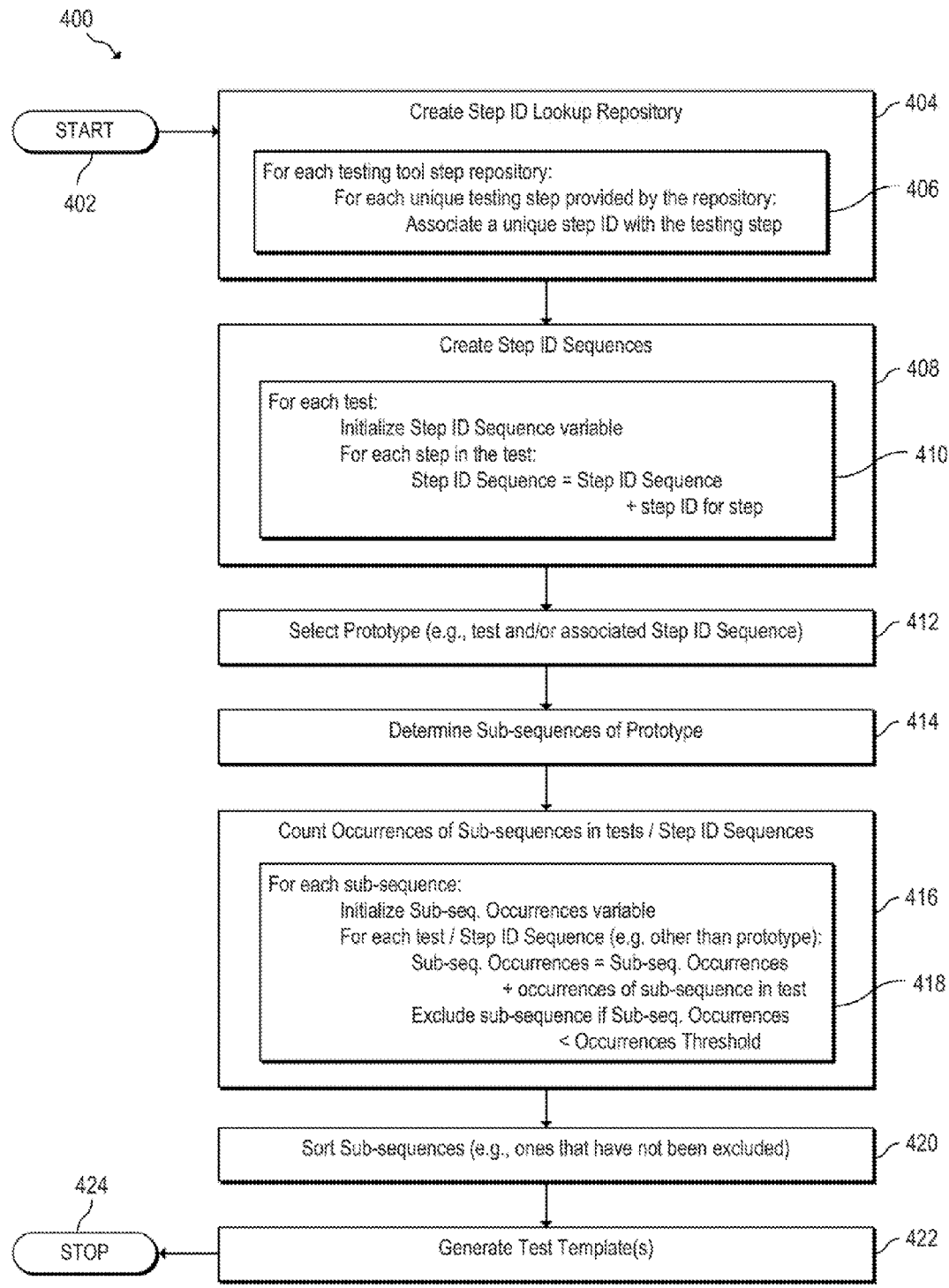
FIG. 4A is a flowchart of an example method for creating test templates based on steps in existing tests.

FIG. 4A is a flowchart of an example method 400 for creating test templates based on steps in existing tests. The execution of method 400 is described below with reference to testing computing device 100; however, part or all of method 400 may be executed in by a different computing device (e.g., computing device 500 of FIG. 5). Method 400 may be implemented in the form of executable instructions stored on a machine-readable storage medium, such as storage medium 520 of FIG. 5, and/or in the form of electronic circuitry. In alternate embodiments of the present disclosure, one or more steps of method 400 may be executed substantially concurrently or in a different order than shown in FIG. 4A. In alternate embodiments of the present disclosure, method 400 may include more or less steps than are shown in FIG. 4A. In some embodiments, one or more of the steps of method 400 may, at certain times, be ongoing and/or may repeat.

Method 400 may start at step 402 and continue to step 404, where testing computing device 100 may create (e.g., via module 110) a step ID lookup repository. As one specific example, as shown in box 406, step 404 may include the following sub-steps: for each testing tool step repository, perform the following: for each unique testing step provided by the repository, associate a unique step ID with the testing step. The unique step IDs and the associated testing steps may be saved (e.g., as a pair) in a step ID lookup repository, as explained above. At step 408, testing computing device may create (e.g., via module 116) step ID sequences from a number of existing tests, as described above. As one specific example, as shown in box 410, step 408 may include the following sub-steps: for each existing test, perform the following: initialize a step ID sequence variable; for each step in the test, set the step ID sequence variable equal to the current step ID sequence variable plus (e.g., append) the unique step ID for the step (e.g., received from the step ID lookup repository). At step 412, testing computing device 100 may select (e.g., via module 122) at least one prototype (e.g., an existing test and/or the associated step ID sequence).

At step 414, testing computing device 100 may determine (e.g., via module 124) the sub-sequences of the prototype(s). At step 416, testing computing device 100 may count (e.g., via 126) the occurrences of sub-sequences in the existing tests/step ID sequences. As one specific example, as shown in box 418, step 416 may include the following sub-steps: for each subsequence, perform the following: initialize a sub-sequence occurrences variable; for each existing test/step ID sequence (e.g., other than the prototype(s)), set the sub-sequence occurrences variable equal to the current sub-sequences occurrences variable plus the number of sub-sequences in the current test/step ID sequence. If the number of occurrences of the sub-sequence in the tests/step ID sequences is less than an occurrence threshold, the sub-sequence may be excluded from further processing. At step 420, testing computing device 100 may sort (e.g., via module 128) the remaining sub-sequences (e.g. the ones that have not been excluded). The sub-sequences may be sorted according to the length of the sub-sequences and/or the number of occurrences of the sub-sequences, for example. At step 422, testing computing device 100 may generate at least one testing template from at least one of the remaining sub-sequences (e.g., one of the top ranked sub-sequences). Method 400 may eventually continue to step 424, where method 400 may stop.

Figure 4B:
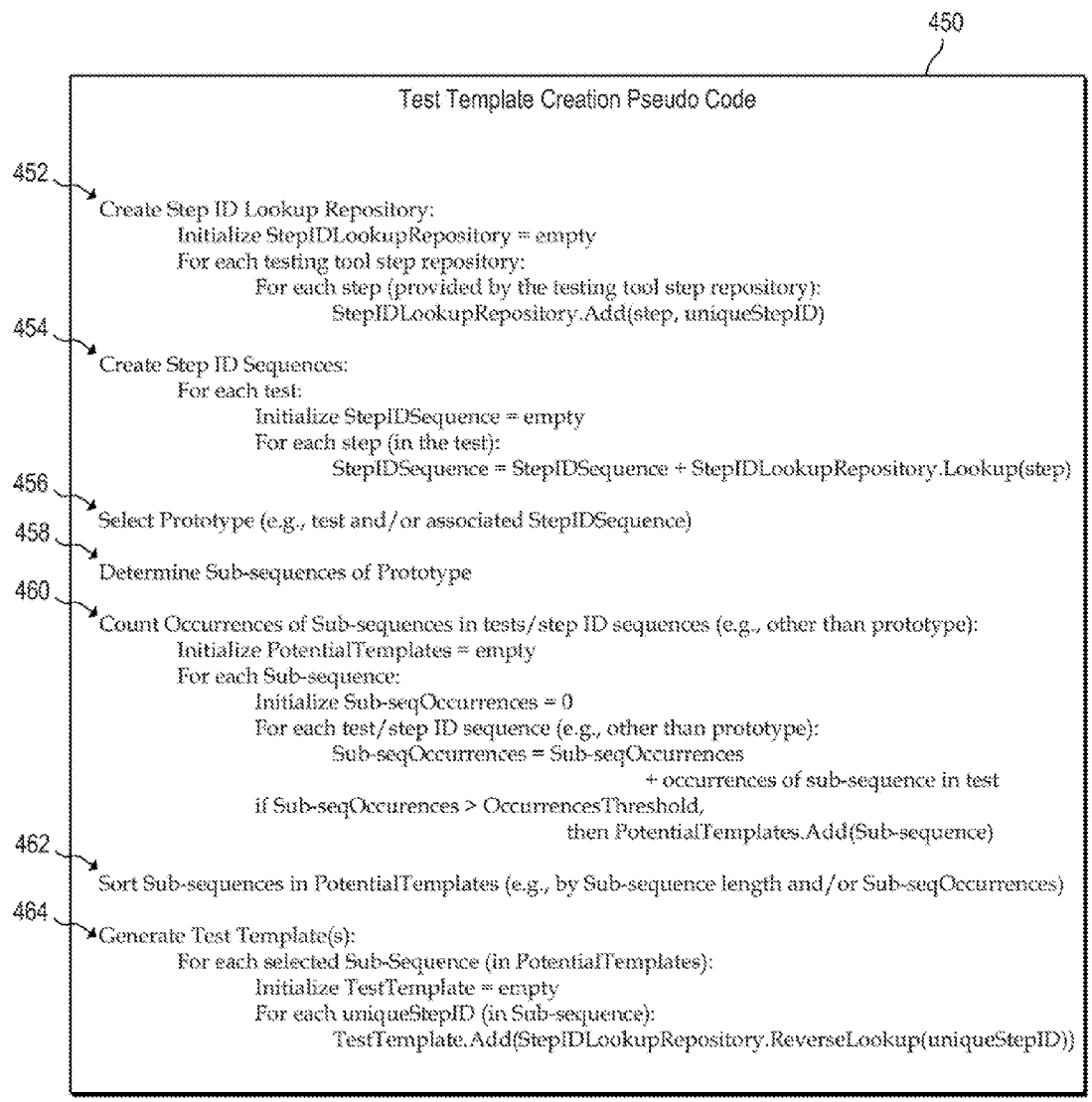
FIG. 4B depicts example pseudo code for creating test templates based on steps in existing tests.

FIG. 4B depicts example pseudo code 450 for creating test templates based on steps in existing tests. Pseudo code 450 may be related to method 400 of FIG. 4A. Source code that is related to pseudo code 450 may be executed by testing computing device 100. However, in alternate embodiments and/or scenarios, part or all of such source code may be executed by a different computing device. Pseudo code 450 may include a set of steps 452 to create a step ID lookup repository. In steps 452, a data structure named "StepIDLookupRepository" (for example) may be initialized. Then, a "for loop" may be executed to walk through all the testing tool step repositories (e.g., 112). Then, within that loop, a "for loop" may be executed to walk through all the testing steps (e.g., provided by the particular testing tool step repository). Within that loop, each step may be added to the StepIDLookupRepository data structure along with a unique step ID (e.g., generated and stored temporarily in a variable named, for example, "uniqueStepID"). Pseudo code 450 may include a set of steps 454 to create step ID sequences. For example, a "for loop" may be executed to walk through all the existing tests. Within that loop, a variable named "StepIDSequence" (for example) may be initialized. Also within that loop, a "for loop" may be executed to walk through all the testing steps in the test. Within that loop, StepIDSequence may be set to equal StepIDSequence plus (e.g., append) the unique step ID associated the step, where the unique step ID may be received as a result of a lookup in the StepIDLookupRepository data structure.

Pseudo code 450 may include a set of steps 456 to select at least one prototype (e.g., at least one test and/or associated step ID sequence), as described in more detail above. Pseudo code 450 may include a set of steps 458 to determine the sub-sequences of the at least one prototype, as explained in more detail above. Pseudo code 450 may include a set of steps 460 to count the occurrences of the sub-sequences in the existing tests/step ID sequences (e.g., other than the prototype (s)). A data structure named "PotentialTemplates" (for example) may be initialized. Then, a "for loop" may be executed to walk through all the sub-sequences. Within that loop a variable named "Sub-seqOccurrences" (for example) may be initialized. Also within that loop, a "for loop" may be executed to walk through all the tests/step ID sequences (e.g., other than the prototype(s)). Within that loop, the Sub-seqOccurrences variable may be set to equal Sub-seqOccurrences plus the number of occurrences of the sub-sequence in the particular test. Once the total number of occurrences for the sub-sequence is known, if Sub-seqOccurrences is greater than an occurrences threshold, then the sub-sequences may be added to the PotentialTemplates data structure.

Pseudo code 450 may include a set of steps 462 to sort sub-sequences in the PotentialTemplates data structure. The sorting may be performed according to sub-sequence length and/or Sub-seqOccurrences, for example. Pseudo code 450 may include a set of steps 464 to generate at least one test template from at least one selected sub-sequence in the PotentialTemplates data structure. The following will assume that a single test template is created for each selected sub-sequence. For example, a "for loop" may be executed to walk through all the sub-sequences in the PotentialTemplates data structure. Within that loop, a variable named "TestTemplate" may be initialized. Also within that loop, a "for loop" may be executed to walk through all the unique step IDs (e.g., assigned one at a time to a variable named "uniqueStepID," for example) in the particular sub-sequence. Within that loop, uniqueStepID may be replaced with the associated testing step (e.g., via a reverse lookup in StepIDLookupRepository). The associated testing step may be added to TestTemplate. TestTemplate may be used to create a test template file for the particular sub-sequence.

Figure 5:
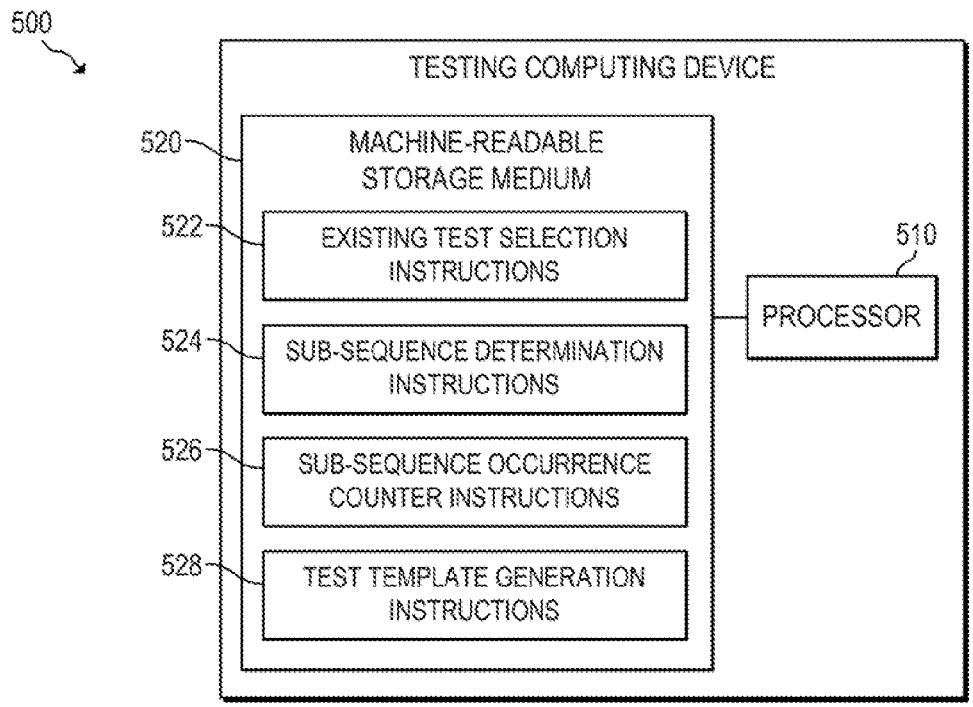
FIG. 5 is a block diagram of an example testing computing device for creating test templates based on steps in existing tests.

FIG. 5 is a block diagram of an example testing computing device 500 for creating test templates based on steps in existing tests. Testing computing device 500 may be any computing device capable of accessing existing testing steps and/or test files and creating at least one test template. More details regarding an example testing computing device may be described herein, for example, with respect to testing computing device 100 of FIG. 1. In the embodiment of FIG. 5, testing computing device 500 includes a processor 510 and a machine-readable storage medium 520.

Processor 510 may be one or more central processing units (CPUs), microprocessors, and/or other hardware devices suitable for retrieval and execution of instructions stored in machine-readable storage medium 520. Processor 510 may fetch, decode, and execute instructions 522, 524, 526, 528 to, among other things, create test templates based on steps in existing tests. With respect to the executable instruction representations (e.g., boxes) shown in FIG. 5, it should be understood that part or all of the executable instructions included within one box may, in alternate embodiments, be included in a different box shown in the figures or in a different box not shown.

Machine-readable storage medium 520 may be any electronic, magnetic, optical, or other physical storage device that stores executable instructions. Thus, machine-readable storage medium 520 may be, for example, Random Access Memory (RAM), an Electrically-Erasable Programmable Read-Only Memory (EEPROM), a storage drive, an optical disc, and the like. Machine-readable storage medium 520 may be disposed within storage computing device 500, as shown in FIG. 5. In this situation, the executable instructions may be "installed" on the device 500. Alternatively, machine-readable storage medium 520 may be a portable (e.g., external) storage medium, for example, that allows storage computing device 500 to remotely execute the instructions or download the instructions from the storage medium. In this situation, the executable instructions may be part of an installation package. As described in detail below, machine-readable storage medium 520 may be encoded with executable instructions for creating test templates based on steps in existing tests.

Existing test selection instructions 522 may access a set of existing tests. Existing test selection instructions 522 may select at least one existing test or related step ID sequence to be at least one prototype that may be used to generate at least one sub-sequence. More details regarding selection of test templates may be described above, for example, with respect to module 116 and/or module 122 of FIG. 1. Sub-sequence determination instructions 524 may analyze at least one prototype to identify a number of sub-sequences. More details regarding creation and/or determination of sub-sequences may be described above, for example, with respect to module 116 and/or module 124 of FIG. 1. Sub-sequence occurrence counter instructions 526 may then search through the existing tests and/or related step ID sequences to count the number of times each sub-sequence appears in the tests/step ID sequences. More details regarding counting occurrences of sub-sequences may be described above, for example, with respect to module 126 of FIG. 1. Test template generation instructions 528 may create at least one test template based on at least one sub-sequence. More details regarding generating test templates may be described above, for example, with respect to module 128 and/or module 130 of FIG. 1.

Figure 6:
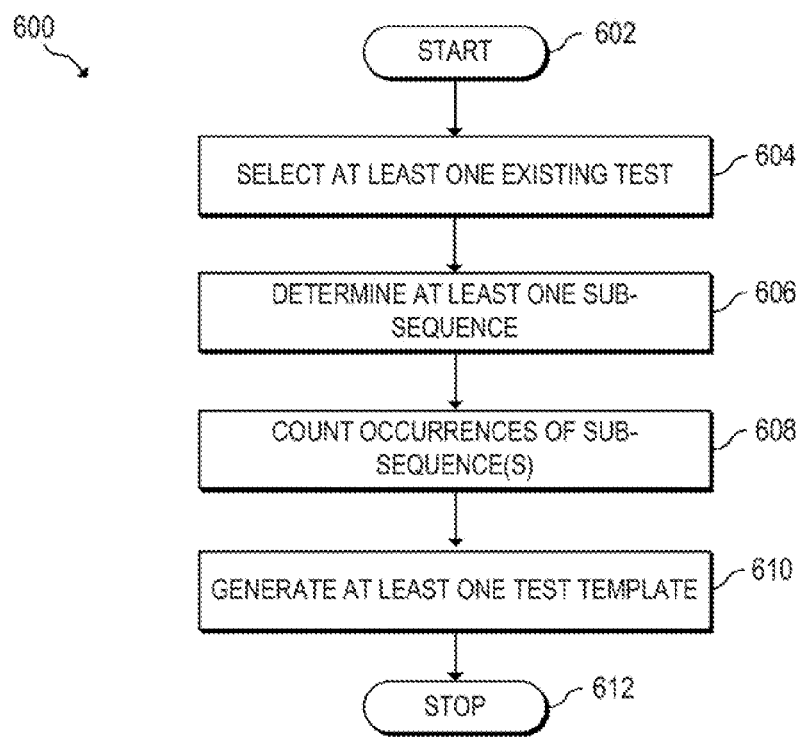
FIG. 6 is a flowchart of an example method for creating test templates based on steps in existing tests.

FIG. 6 is a flowchart of an example method 600 for creating test templates based on steps in existing tests. Method 600 may be executed by a testing computing device that may be similar to testing computing device 500 of FIG. 5. Other suitable computing devices may be used as well, for example, computing device 100 of FIG. 1. Method 600 may be implemented in the form of executable instructions stored on a machine-readable storage medium, such as storage medium 520. In alternate embodiments of the present disclosure, one or more steps of method 600 may be executed substantially concurrently or in a different order than shown in FIG. 6. In alternate embodiments of the present disclosure, method 600 may include more or less steps than are shown in FIG. 6. In some embodiments, one or more of the steps of method 600 may, at certain times, be ongoing and/or may repeat.

Method 600 may start at step 602 and continue to step 604, where testing computing device 500 may select at least one existing test. At step 606, testing computing device 500 may determine at least one sub-sequence. At step 608, testing computing device 500 may count occurrences of at least one sub-sequence in at least one existing test and/or at least one related step ID sequence. At step 610, testing computing device 500 may generate at least one test template based on at least one sub-sequence. Method 600 may eventually continue to step 612, where method 600 may stop.

The invention claimed is:

1. A testing computing device for creating test templates based on steps in existing tests, the testing computing device comprising:
 a processor to:
  select an existing test from multiple existing tests, wherein each existing test of the multiple existing tests includes a set of distinct steps;
  determine a sub-sequence related to the selected existing test, wherein the sub-sequence is based on a subset of the distinct steps included in the selected existing test;
  determine that the distinct steps in the subset occur in a number of existing tests from the multiple existing tests;
  determine that the number of existing tests within which the distinct steps in the subset occur is greater than an occurrences threshold; and
  generate a test template using the sub-sequence, wherein the test template includes the distinct steps in the subset.

2. The testing computing device of claim 1, wherein the processor is further to create, for each existing test, a step identifier sequence that includes a number of step identifiers, one for each distinct step of the particular existing test, and wherein the sub-sequence includes a number of step identifiers, one for each of the distinct steps in the subset.

3. The testing computing device of claim 1, wherein the determination that the distinct steps in the subset occur in a number of existing tests is further to determine that the step identifiers of the sub-sequence occur in a number of step identifier sequences associated with the multiple existing tests.

4. The testing computing device of claim 1, wherein the processor is further to access a repository that associates distinct steps with step identifiers, wherein the repository is accessed to create the step identifier sequences for the existing tests.

5. The testing computing device of claim 4, wherein the generation of the test template includes accessing the repository to determine a distinct step associated with each step ID of the sub-sequence.

6. A method for creating test templates based on steps in existing tests, the method comprising:
 accessing multiple existing tests, wherein each existing test includes a number of distinct steps;
 for each existing test of the multiple existing tests, creating a step identifier sequence that includes a set of unique step identifiers, one for each distinct step in the existing test;
 selecting one of the step identifier sequences to be a prototype;
 determining a number of sub-sequences associated with the prototype, wherein each sub-sequence includes a different subset of the unique step identifiers included in the prototype;

determining, for each of the sub-sequences, an occurrence count that indicates how many of the step identifier sequences include all of the unique step identifiers of the particular sub-sequence;

selecting one of the sub-sequences based on the occurrence count associated with the selected sub-sequence; and creating a test template from the selected sub-sequence, wherein the test template includes the distinct steps associated with the unique step identifiers of the selected sub-sequence.

7. The method of claim 6, wherein selecting one of the sub-sequences based on the occurrence count includes determining that the occurrence count is greater than an occurrences threshold.

8. The method of claim 6, wherein the selection of one of the sub-sequences is further based on the number of unique step identifiers included in the sub-sequence.

9. The method of claim 6, further comprising creating a list of the sub-sequences that is sorted or grouped based on the occurrence count of each sub-sequences and/or the number of unique step identifiers in each sub-sequence, wherein selecting one of the sub-sequences includes using the list.

10. The method of claim 6, further comprising maintaining a repository that associates distinct steps with step identifiers, wherein creating the step identifier sequences for each existing test includes accessing the repository.

11. A non-transitory machine-readable storage medium encoded with instructions executable by a processor of a testing computing device for creating test templates based on steps in existing tests, the machine-readable storage medium comprising:

instructions to analyze multiple existing tests to identify, for each existing test, a number of distinct steps;

instructions to determine a set of distinct steps, wherein the distinct steps of the set are distinct steps found in at least one of the existing tests, and wherein the length of the set equals the number of distinct steps in the set;

instructions to determine that the set of distinct steps is valuable as a test template based on the length of the set and/or based on the distinct steps of the set being found in a number of the existing tests; and instructions to generate a test template based on the set of distinct steps, wherein the determination that the set of distinct steps is valuable is further based on the number of the existing tests within which the distinct steps are found being greater than an occurrences threshold.

12. The non-transitory machine-readable storage medium of claim 11, wherein the distinct steps of the multiple existing tests are testing steps provided by at least one testing tool.

13. The non-transitory machine-readable storage medium of claim 11, wherein the set of distinct steps is determined based on one of the existing tests selected to be a prototype.

* * * * *